(12) United States Patent
Jiang

(10) Patent No.: US 12,411,530 B2
(45) Date of Patent: Sep. 9, 2025

(54) HINGE, FLEXIBLE DISPLAY PANEL AND ELECTRONIC DEVICE

(71) Applicant: WUHAN CHINA STAR OPTOELECTRONICS SEMICONDUCTOR DISPLAY TECHNOLOGY CO., LTD., Wuhan (CN)

(72) Inventor: Guobao Jiang, Wuhan (CN)

( * ) Notice: Subject to any disclaimer, the term of this patent is extended or adjusted under 35 U.S.C. 154(b) by 75 days.

(21) Appl. No.: 17/438,432

(22) PCT Filed: Aug. 13, 2021

(86) PCT No.: PCT/CN2021/112503
§ 371 (c)(1),
(2) Date: Sep. 12, 2023

(87) PCT Pub. No.: WO2023/279476
PCT Pub. Date: Jan. 12, 2023

(65) Prior Publication Data
US 2024/0019909 A1    Jan. 18, 2024

(30) Foreign Application Priority Data
Jul. 5, 2021   (CN) .......................... 202121529844.7

(51) Int. Cl.
*G06F 1/16* (2006.01)
(52) U.S. Cl.
CPC .......... *G06F 1/1681* (2013.01); *G06F 1/1652* (2013.01)

(58) Field of Classification Search
CPC .... G06F 1/1681; G06F 1/1652; G06F 1/1616; G06F 9/301; G06F 9/30; H05K 5/0226; F16C 11/04; F16C 11/10
See application file for complete search history.

(56) References Cited

U.S. PATENT DOCUMENTS

| | | | | |
|---|---|---|---|---|
| 2019/0075196 A1* | 3/2019 | Mok | ..................... | G06F 1/1652 |
| 2021/0165466 A1* | 6/2021 | Kang | ..................... | G06F 1/1616 |
| 2022/0159109 A1* | 5/2022 | Kang | ..................... | G06F 1/1616 |

(Continued)

FOREIGN PATENT DOCUMENTS

| | | |
|---|---|---|
| CN | 103576775 A | 2/2014 |
| CN | 208919053 U | 5/2019 |
| CN | 110442196 A | 11/2019 |

(Continued)

OTHER PUBLICATIONS

International Search Report in International application No. PCT/CN2021/112503, mailed on Apr. 6, 2022.

(Continued)

*Primary Examiner* — Abhishek M Rathod

(57) ABSTRACT

A hinge, a flexible display panel, and an electronic device are provided by the present disclosure. The electronic device includes a flexible display panel which includes a hinge. The hinge includes a first rotation mechanism, a second rotation mechanism, and a moving block. The first rotation mechanism and the second rotation mechanism are interlinked by the moving block, so that the first rotation mechanism and the second rotation mechanism always maintain the same rotation speed, thereby achieving an effect of bilateral synchronous movement in the electronic device.

17 Claims, 11 Drawing Sheets

(56) References Cited

U.S. PATENT DOCUMENTS

2023/0118440 A1\* 4/2023 Lee .................... G06F 1/1652
                                                                                                       361/807

FOREIGN PATENT DOCUMENTS

| CN | 211123830 U | 7/2020 |
| CN | 112901643 A | 6/2021 |
| CN | 113027899 A | 6/2021 |
| CN | 113202857 A | 8/2021 |
| KR | 20200047253 A | 5/2020 |

OTHER PUBLICATIONS

Written Opinion of the International Search Authority in International application No. PCT/CN2021/112503, mailed on Apr. 6, 2022.

\* cited by examiner

HINGE, FLEXIBLE DISPLAY PANEL AND ELECTRONIC DEVICE

FIELD OF INVENTION

The present disclosure relates to the field of display technologies, and in particular to a hinge, a flexible display panel and an electronic device.

BACKGROUND OF INVENTION

With continuous developments of display technologies, in order to meet different usage requirements, various displays with different characteristics have emerged. A development trend of intelligence, portability, and flexibility is one of the main development directions of current electronic devices. Compared with traditional flat panel display technologies, the most prominent advantages of flexible display technologies are breaking through an inherent concept of original two-dimensional display and expanding an application field of the display technologies to more portable electronic devices. A user can fold or roll an electronic device provided with the flexible display panel as needed, so as to reduce a size of the electronic device, thereby improving portability of the electronic device.

Technical Problems

The existing foldable electronic devices realize an effect of unfolding and folding by two rotation mechanisms disposed opposite to each other in the hinge. During folding or unfolding processes of the electronic devices, since the two rotation mechanisms in the hinge cannot always rotate at the same speed, a bilateral synchronous rotation cannot be achieved in the electronic devices, resulting in a flexible display panel main body of the electronic device being pressed or pulled by the hinge, thereby reducing service lives of the electronic devices.

As mentioned above, the hinge in the existing foldable electronic devices exists a problem that the bilateral synchronous rotation cannot be achieved. Therefore, it is necessary to provide a display panel and a display device to improve this defect.

SUMMARY OF INVENTION

Technical Solutions

Embodiments of the present disclosure provide a hinge, a flexible display panel, and an electronic device, which are used to solve a problem that a hinge in the existing foldable electronic device cannot realize bilateral synchronous rotation.

An embodiment of the present disclosure provides a hinge, including:
  a fixed support;
  a first rotation mechanism including a first rotation member and a first transmission member, wherein the first rotation member is rotatably connected to the fixed support, and the first transmission member is fixedly connected to the first rotation member;
  a second rotation mechanism disposed opposite the first rotation mechanism and including a second rotation member and a second transmission member, wherein the second rotation member is rotatably connected to the fixed support, and the second transmission member is fixedly connected to the second rotation member; and
  a moving block, wherein the first transmission member and the second transmission member are rotatably connected to the moving block, so as to drive the moving block away from or close to the fixed support.

According to an embodiment of the present disclosure, the first transmission member includes a first link, the second transmission member includes a second link, and the moving block includes a base portion and a first extension portion and a second extension portion, which are connected to opposite sides of the base portion, wherein each of the first extension portion and the second extension portion includes two opposite extension plates extending from the base portion;
  wherein one end of the first link is fixedly connected to the first rotation member, the other end of the first link is rotatably connected between the two extension plates of the first extension portion of the moving block, one end of the second link is fixedly connected to the second rotation member, and the other end of the second link is rotatably connected between the two extension plates of the second extension portion of the moving block.

According to an embodiment of the present disclosure, a first chute is defined by the fixed support, and the moving block is slidably disposed in the first chute.

According to an embodiment of the present disclosure, a wall surface of the first chute is provided with a protrusion, a groove is defined by the base portion of the moving block, and the protrusion is slidably received in the groove.

According to an embodiment of the present disclosure, the hinge further comprises a holding mechanism, and the holding mechanism includes a first holding arm, a second holding arm, and a first holding member, wherein the first holding member is provided with a first protrusion and a second protrusion, a first groove is defined by the first holding arm, and a second groove is defined by the second holding arm;
  wherein the first holding arm is connected to the first rotation member, the second holding arm is connected to the second rotation member, and the first rotation member and the second rotation member are rotatably connected to the first holding member;
  in response to the hinge being in one of a folded state or an unfolded state, the first protrusion is received in the first groove, and the second protrusion is received in the second groove; in response to the hinge being in the other state of the folded state or the unfolded state, the first protrusion is separated from the first groove, and the second protrusion is separated from the second groove.

According to an embodiment of the present disclosure, the holding mechanism includes a first elastic member and a second elastic member, and the fixed support includes a main body portion and a first connection portion and a second connection portion, which extend from opposite sides of the main body portion, wherein the first rotation member passes through the first connection portion, and the second rotation member passes through the second connection portion;
  wherein the first elastic member surrounds the first rotation member and is clamped between the first holding member and the first connection portion, and the second elastic member surrounds the second rotation member and is clamped between the first holding portion and the first connection portion.

According to an embodiment of the present disclosure, the hinge further comprises a first support plate and a second support plate;

wherein the first support plate is connected to the first holding arm, so as to move under driving of the first holding arm, and the second support plate is connected to the second holding arm, so as to move under driving of the second holding arm.

According to an embodiment of the present disclosure, the hinge further comprises a first fixing member and a second fixing member, wherein a second chute is defined by the first support plate, a third chute is defined by the second support plate, the first fixing member passes through the second chute and is fixedly connected to the first holding arm, and the second fixing member passes through the third chute and is fixedly connected to the second holding arm;

wherein a position of the first fixing member in the second chute where the hinge is in the unfolded state is different from a position of the first fixing member in the second chute where the hinge being in the folded state; and a position of the second fixing member in the third chute where the hinge is in the unfolded state is different from a position of the second fixing member in the third chute where the hinge being in the folded state.

An embodiment of the present disclosure further provides a flexible display panel, including:

a flexible display panel main body including a flexible portion and a first portion and a second portion, which are connected to opposite ends of the flexible portion; and a hinge, including:

a fixed support;

a first rotation mechanism including a first rotation member and a first transmission member, wherein the first rotation member is rotatably connected to the fixed support, and the first transmission member is fixedly connected to the first rotation member;

a second rotation mechanism disposed opposite the first rotation mechanism and including a second rotation member and a second transmission member, wherein the second rotation member is rotatably connected to the fixed support, and the second transmission member is fixedly connected to the second rotation member; and a moving block, wherein the first transmission member and the second transmission member are rotatably connected to the moving block, so as to drive the moving block away from or close to the fixed support;

wherein the first portion is fixedly connected to the first rotation member, the second portion is fixedly connected to the second rotation member, and the moving block is located under the flexible portion.

According to an embodiment of the present disclosure, the first transmission member includes a first link, the second transmission member includes a second link, and the moving block includes a base portion and a first extension portion and a second extension portion, which are connected to opposite sides of the base portion, wherein each of the first extension portion and the second extension portion includes two opposite extension plates extending from the base portion;

wherein one end of the first link is fixedly connected to the first rotation member, the other end of the first link is rotatably connected between the two extension plates of the first extension portion of the moving block, one end of the second link is fixedly connected to the second rotation member, and the other end of the second link is rotatably connected between the two extension plates of the second extension portion of the moving block.

According to an embodiment of the present disclosure, a first chute is defined by the fixed support, and the moving block is slidably disposed in the first chute.

According to an embodiment of the present disclosure, a wall surface of the first chute is provided with a protrusion, a groove is defined by the base portion of the moving block, and the protrusion is slidably received in the groove.

According to an embodiment of the present disclosure, the hinge further comprises a holding mechanism, and the holding mechanism includes a first holding arm, a second holding arm, and a first holding member, wherein the first holding member is provided with a first protrusion and a second protrusion, a first groove is defined by the first holding arm, and a second groove is defined by the second holding arm;

wherein the first holding arm is connected to the first rotation member, the second holding arm is connected to the second rotation member, and the first rotation member and the second rotation member are rotatably connected to the first holding member;

in response to the hinge being in one of a folded state or an unfolded state, the first protrusion is received in the first groove, and the second protrusion is received in the second groove; in response to the hinge being in the other state of the folded state or the unfolded state, the first protrusion is separated from the first groove, and the second protrusion is separated from the second groove.

According to an embodiment of the present disclosure, the holding mechanism includes a first elastic member and a second elastic member, and the fixed support includes a main body portion and a first connection portion and a second connection portion, which extend from opposite sides of the main body portion, wherein the first rotation member passes through the first connection portion, and the second rotation member passes through the second connection portion;

wherein the first elastic member surrounds the first rotation member and is clamped between the first holding member and the first connection portion, and the second elastic member surrounds the second rotation member and is clamped between the first holding portion and the first connection portion.

According to an embodiment of the present disclosure, the hinge further comprises a first support plate and a second support plate;

wherein the first support plate is connected to the first holding arm, so as to move under driving of the first holding arm, and the second support plate is connected to the second holding arm, so as to move under driving of the second holding arm.

According to an embodiment of the present disclosure, the hinge further comprises a first fixing member and a second fixing member, wherein a second chute is defined by the first support plate, a third chute is defined by the second support plate, the first fixing member passes through the second chute and is fixedly connected to the first holding arm, and the second fixing member passes through the third chute and is fixedly connected to the second holding arm;

wherein a position of the first fixing member in the second chute where the hinge is in the unfolded state, is different from a position of the first fixing member in the second chute where the hinge is in the folded state; and a position of the second fixing member in the third chute where the hinge is in the unfolded state, is different from a position of the second fixing member in the third chute where the hinge is in the folded state.

An embodiment of the present disclosure further provides an electronic device, comprising: a flexible display panel, and the flexible display panel includes:
a fixed support;
a first rotation mechanism including a first rotation member and a first transmission member, wherein the first rotation member is rotatably connected to the fixed support, and the first transmission member is fixedly connected to the first rotation member;
a second rotation mechanism disposed opposite the first rotation mechanism and including a second rotation member and a second transmission member, wherein the second rotation member is rotatably connected to the fixed support, and the second transmission member is fixedly connected to the second rotation member; and
a moving block, wherein the first transmission member and the second transmission member are rotatably connected to the moving block, so as to drive the moving block away from or close to the fixed support;
wherein the first portion is fixedly connected to the first rotation member, the second portion is fixedly connected to the second rotation member, and the moving block is located under the flexible portion.

According to an embodiment of the present disclosure, the first transmission member includes a first link, the second transmission member includes a second link, and the moving block includes a base portion and a first extension portion and a second extension portion, which are connected to opposite sides of the base portion, wherein each of the first extension portion and the second extension portion includes two opposite extension plates extending from the base portion;
wherein one end of the first link is fixedly connected to the first rotation member, the other end of the first link is rotatably connected to between the two extension plates of the first extension portion of the moving block, one end of the second link is fixedly connected to the second rotation member, and the other end of the second link is rotatably connected between the two extension plates of the second extension portion of the moving block.

According to an embodiment of the present disclosure, a first chute is defined by the fixed support, and the moving block is slidably disposed in the first chute.

According to an embodiment of the present disclosure, a wall surface of the first chute is provided with a protrusion, a groove is defined by the base portion of the moving block, and the protrusion is slidably received in the groove.

Beneficial effect of the embodiments of the present disclosure:

The embodiments of the present disclosure provide a hinge, a flexible display panel, and an electronic device. The electronic device includes a flexible display panel which includes a flexible display panel body and a hinge. The flexible display panel body includes a flexible portion and a first portion and a second portion, which are connected to opposite ends of the flexible portion. The hinge includes a first rotation mechanism, a second rotation mechanism, and a moving block. The first rotation mechanism includes a first rotation member and a first transmission member. The first rotation member is rotatably connected to the fixed support, and the first transmission member is fixedly connected to the first rotation member. The second rotation mechanism is disposed opposite the first rotation mechanism, and includes a second rotation member and a second transmission member. The second rotation member is rotatably connected to the fixed support, and the second transmission member is fixedly connected to the second rotation member. The first portion is fixedly connected to the first rotation member, the second portion is fixedly connected to the second rotation member, the moving block is located under the flexible portion, and the first transmission member and the second transmission member are rotatably connected to the moving block, so as to drive the moving block away from or close to the fixed support. The first rotation mechanism and the second rotation mechanism are interlinked by the moving block, so that the first rotation mechanism and the second rotation mechanism rotate at the same speed, thereby achieving an effect of bilateral synchronous movement in the electronic device, and preventing the flexible display panel main body from being pressed or pulled during folding or unfolding processes of the electronic device.

DESCRIPTION OF DRAWINGS

In order to illustrate technical solutions in the embodiments or in the prior art more clearly, attached drawings required for describing the embodiments or prior art will be simply explained as below. Apparently, the attached drawings for the following description are only some embodiments of the present disclosure. Those skilled in the art also could derive other attached drawings from these attached drawings without making a creative work.

DETAILED DESCRIPTION OF PREFERRED EMBODIMENTS

Figure 1:
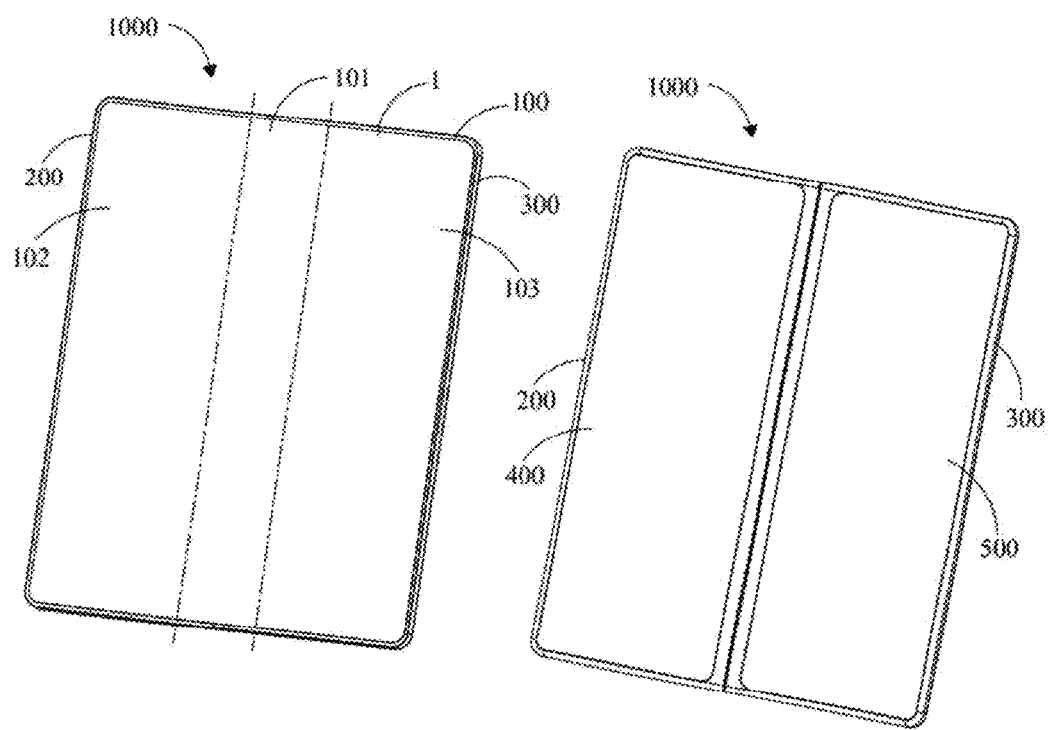
FIG. 1 is a schematic diagram of the front and back structures of an electronic device provided in an embodiment of the present disclosure in an unfolded state.

The description of the following embodiments refers to the attached drawings to illustrate specific embodiments that can be implemented in the present disclosure. The directional terms mentioned in the present disclosure, such as "upper", "lower", "front", "back", "left", "right", "inner", "outer", and "lateral" merely refer to the directions of the attached drawings. Therefore, the directional terms are used to illustrate and understand the present disclosure, rather than to limit the present disclosure. In the drawings, units with similar structures are indicated by the same reference numerals.

The present disclosure is further described below with reference to the drawings and specific embodiments.

An embodiment of the present disclosure provides a hinge 2, a flexible display panel 100, and an electronic device 1000. The electronic device 1000 includes the flexible display panel 100 which includes the hinge 2.

In the embodiment of the present disclosure, the electronic device 1000 may be a mobile terminal, such as a smart phone, a tablet computer, a notebook computer, and the like. The electronic device 1000 may further be a wearable terminal, such as a smart watch, a smart bracelet, smart glasses, an augmented reality device, and the like. An electronic device 1000 may further be a fixed terminal, such as a desktop computer, a TV, and the like.

Figure 2:
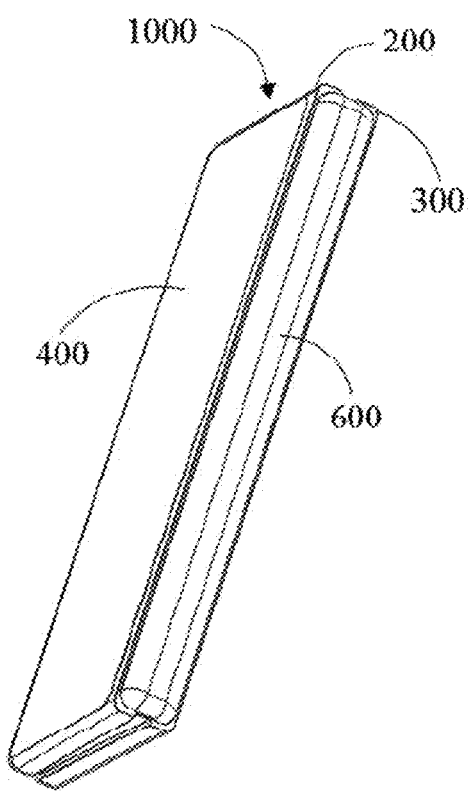
FIG. 2 is a schematic structural diagram of an electronic device in a folded state according to an embodiment of the present disclosure.
Figure 3:
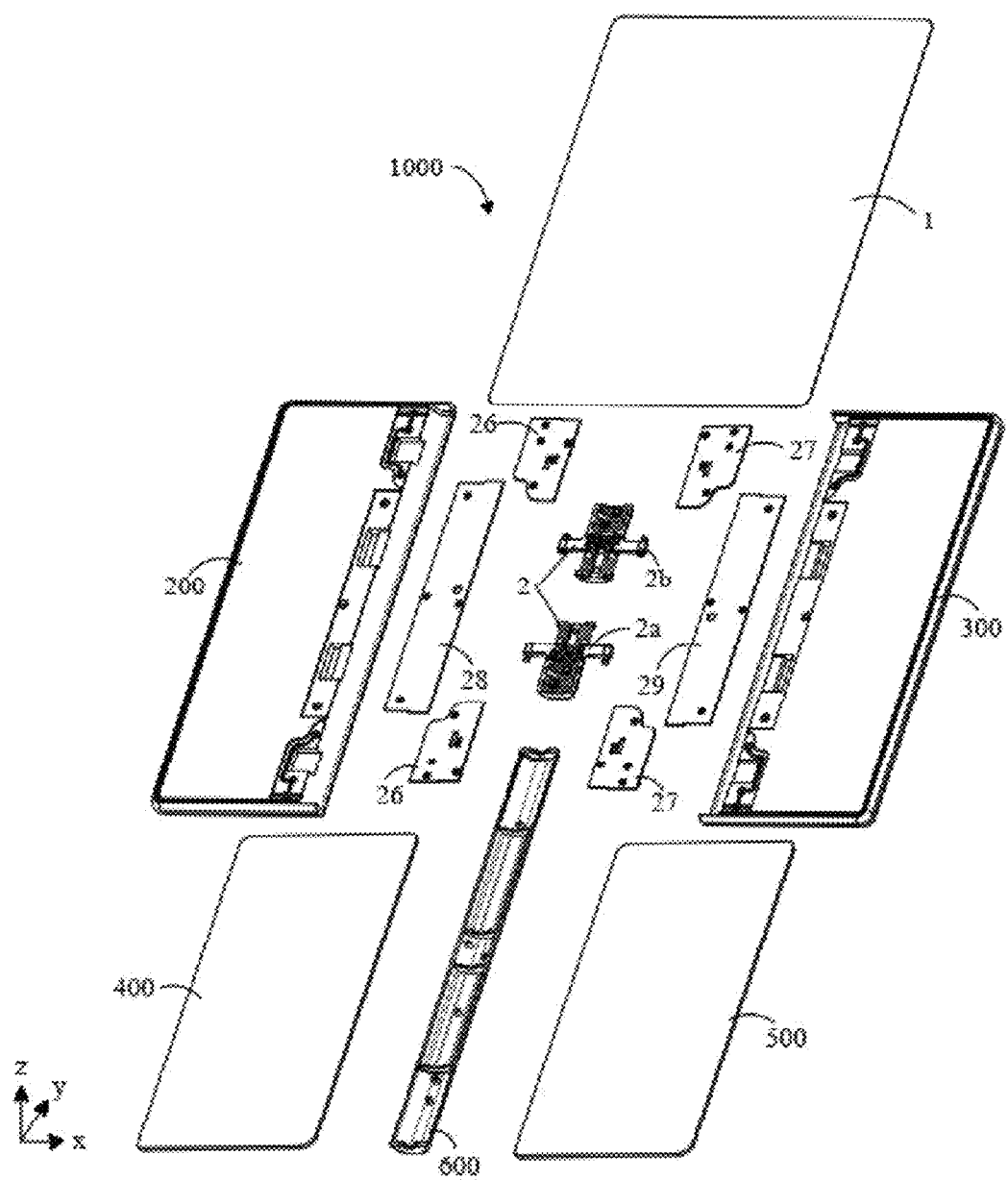
FIG. 3 is a schematic exploded diagram of an electronic device provided by an embodiment of the present disclosure.

As shown in FIGS. 1 to 3, FIG. 1 is a schematic structural diagram of the front and back of the electronic device in an unfolded state provided by an embodiment of the present disclosure, FIG. 2 is a schematic structural diagram of the electronic device in a folded state provided by an embodiment of the present disclosure, and FIG. 3 is a schematic exploded diagram of an electronic device provided by an embodiment of the present disclosure. The electronic device 1000 includes a flexible display panel 100, a first housing 200, a second housing 300, a first back plate 400, and a second back plate 500, and a third housing 600.

The flexible display panel 100 includes a flexible display panel main body 1. The flexible display panel main body 1 includes a flexible portion 101 and a first portion 102 and a second portion 103 located on opposite sides of the flexible portion 101. The flexible portion 101 is a folded portion of the flexible display panel main body 1. The first portion 102 may be disposed on at least a portion of the front side of the first housing 200, and the second portion 103 may be disposed on at least a portion of the front side of the second housing 300.

The first back plate 400 is disposed on a side of the first housing 200 away from the flexible display panel 100, and the second back plate 500 is disposed on a side of the second housing 300 away from the flexible display panel 100. The first housing 200 and the second housing 300 may individually have a separate space, which can receive electronic components in the electronic device, such as a motherboard, a printed circuit board, a battery, and the like, which are required for driving the flexible display panel 100.

It should be noted that the electronic device 1000 may have at least one rotation axis for folding the electronic device 1000. In the following description, a first direction x represents a direction perpendicular to the rotation axis, a second direction y represents a direction parallel to the rotation axis, and a third direction z represents a thickness direction of the electronic device 1000. A display surface of the electronic device may be defined by the first direction x and the second direction y.

The flexible display panel 100 further includes a hinge 2 which includes a first hinge 2a and a second hinge 2b, and the first hinge 2a and the second hinge 2b are individually disposed on opposite ends of the third housing 600. The first hinge 2a and the second hinge 2b may be disposed between the first housing 200 and the second housing 300. The first hinge 2a and the second hinge 2b are both connected to the first housing 200 and the second housing 300. The first hinge 2a and the second hinge 2b may be configured to rotate the first housing 200 and the second housing 300 about two rotation axes parallel to the second direction y and are spaced in the first direction x.

In the embodiment of the present disclosure, structures of the first hinge 2a and the second hinge 2b are the same, and movement processes of the first hinge 2a and the second hinge 2b are also the same. In the following description, each schematic diagram merely takes the structure of the first hinge 2a as an example for illustration, and will not be repeated here. In practical applications, structures of the first hinge 2a and the second hinge 2b may further be different, but must be satisfied with the requirement that the first housing 200 and the second housing 300 can be rotated synchronously by the first hinge 2a and the second hinge 2b.

It should be noted that in the following description, the unfolded state may refer to the electronic device 1000 being completely unfolded, and a front side of the first housing 200 and a front side of the second housing 300 may form together a plane, so that a state of an angle of about 180 degrees is formed between the front side of the first housing 200 and the front side of the second housing 300. The folded state includes a completely folded state and a transitional folded state. The completely folded state may refer to the electronic device 1000 being completely folded. The front side of the first housing 200 and the front side of the second housing 300 may face each other, so that a state of an angle of about 0 degrees is formed between the front side of the first housing 200 and the front side of the second housing 300. The transitional folded state may refer to any transitional state between the unfolded state and the completely folded state of the electronic device 1000. The front side of the first housing 200 and the front side of the second housing 300 form together an included angle approximately greater than 0 degrees and less than 180 degrees.

The third housing 600 may be disposed between the first housing 200 and the second housing 300, and the third housing 600 may cover an outside of the hinge 2 and may protect the hinge 2.

As the electronic device 1000 is unfolded from the folded state to the unfolded state, a space between the side of the first housing 200 and the side of the second housing 300 may gradually narrow, and an opposite side of the third housing 600 may be inserted into the first housing 200 and the second housing 300. In response to the electronic device 1000 being in a unfolded state, the third housing 600 may be covered by the first back plate 400 and the second back plate 500, and will not be exposed to the outside.

As the electronic device 1000 is folded from the unfolded state to the folded state, the space between the side of the first housing 200 and the side of the second housing 300 may gradually widen, and the third housing 600 may be gradually exposed by the first housing 200 and the second housing 300 are. In response to the electronic device 1000 being in a completely folded state, at least a portion of the third housing 600 may be exposed to the outside between the side of the first housing 200 and the side of the second housing 300, and the first back plate 400 and the second back plate 500 can still cover some remaining portions of the third housing 600.

Figure 4:
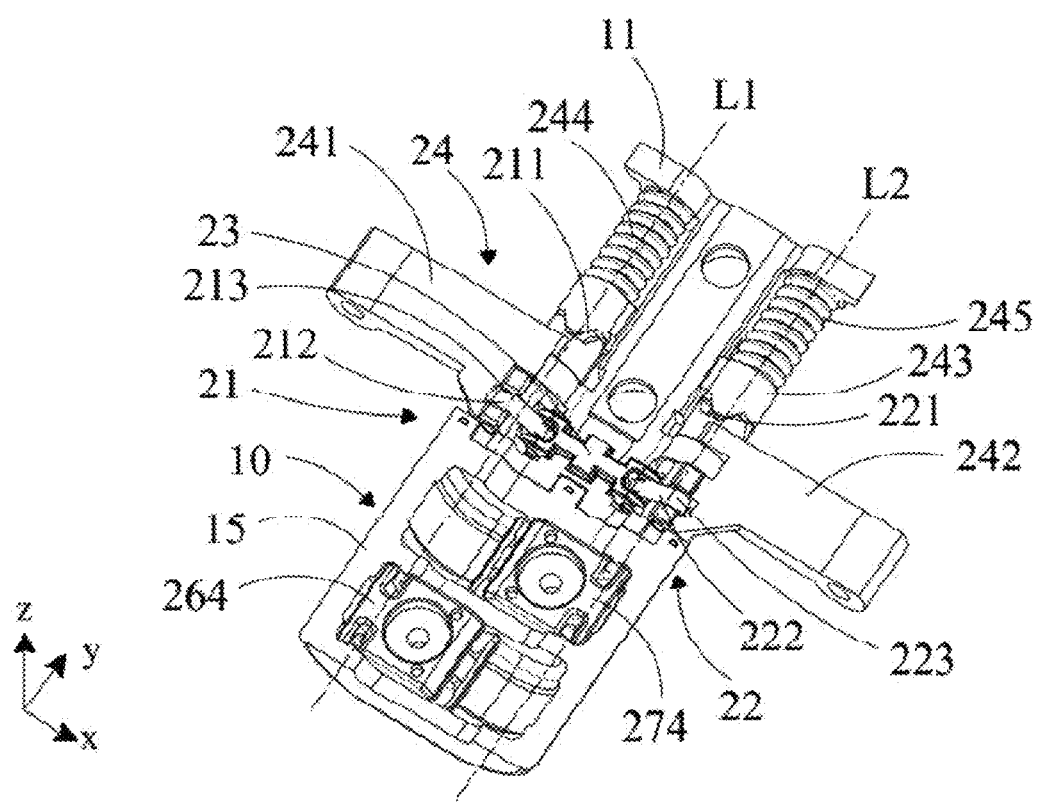
FIG. 4 is a schematic structural diagram of a hinge provided by an embodiment of the present disclosure.

Refer to FIGS. 3 and 4. FIG. 4 is a schematic structural diagram of the hinge provided by an embodiment of the present disclosure. It should be noted that in the embodiment of the present disclosure, the structures of the first hinge 2a and the second hinge 2b are the same. In FIG. 4, only the first hinge 2a is taken as an example for illustration. Both the first hinge 2a and the second hinge 2b include a fixed support 10, a first rotation mechanism 21, a second rotation mechanism 22, and a moving block 23.

The first rotation mechanism 21 and the second rotation mechanism 22 are individually movably connected to the fixed support 10, and the first rotation mechanism 21 is disposed opposite the second rotation mechanism 22. The rotation axes include a first axis L1 and a second axis L2, and the first axis L1 and the second axis L2 are parallel to the second direction y and are spaced in the first direction x. The first rotation mechanism 21 can rotate about the first axis L1, and the second rotation mechanism 22 can rotate about the second axis L2. In the embodiment of the present disclosure, the structures of the first rotation mechanism 21 and the second rotation mechanism 22 are the same. In practical applications, the structures of the first rotation mechanism 21 and the second rotation mechanism 22 may be the same or different, and are not limited thereto.

The moving block 23 is movably connected to the first rotation mechanism 21 and the second rotation mechanism 22, and is located under the flexible portion 101 of the flexible display panel main body 1. During the folding or unfolding process of the electronic device 1000, the moving block 23 merely moves along the third direction z or a reverse movement opposite the third direction z, so that the first rotation mechanism 21 and the second rotation mechanism 22 can maintain a synchronous movement.

The first rotation mechanism 21 includes a first rotation member 211 and a first transmission member 212. The first rotation member 211 is rotatably connected to the fixed support 10, and the first transmission member 212 is fixedly connected to the first rotation member 211. The second rotation mechanism 22 includes a second rotation member 221 and a second transmission member 222, the second rotation member 221 is rotatably connected to the fixed support 10, and the second transmission member 222 is fixedly connected to the second rotation member 221. The first transmission member 212 and the second transmission member 222 are rotatably connected to the moving block 23, so as to drive the moving block 23 away from or close to the fixed support 10.

Figure 5:
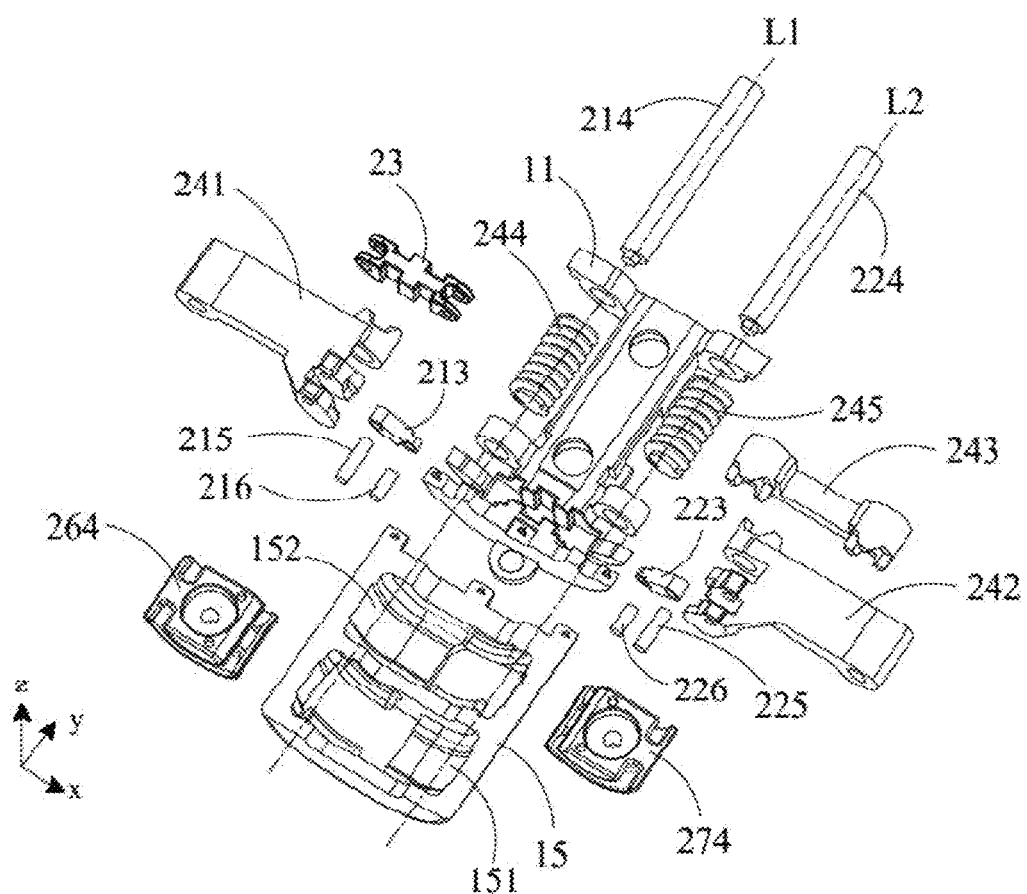
FIG. 5 is a schematic exploded diagram of a hinge provided by an embodiment of the present disclosure.
Figure 6:
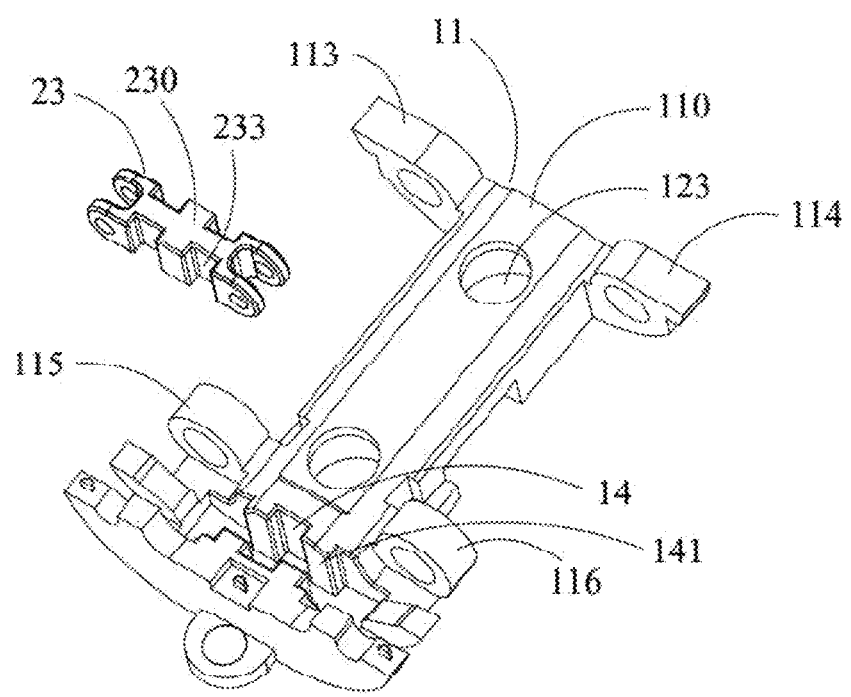
FIG. 6 is a schematic structural diagram of a moving block and a fixed support provided by an embodiment of the present disclosure.
Figure 7:
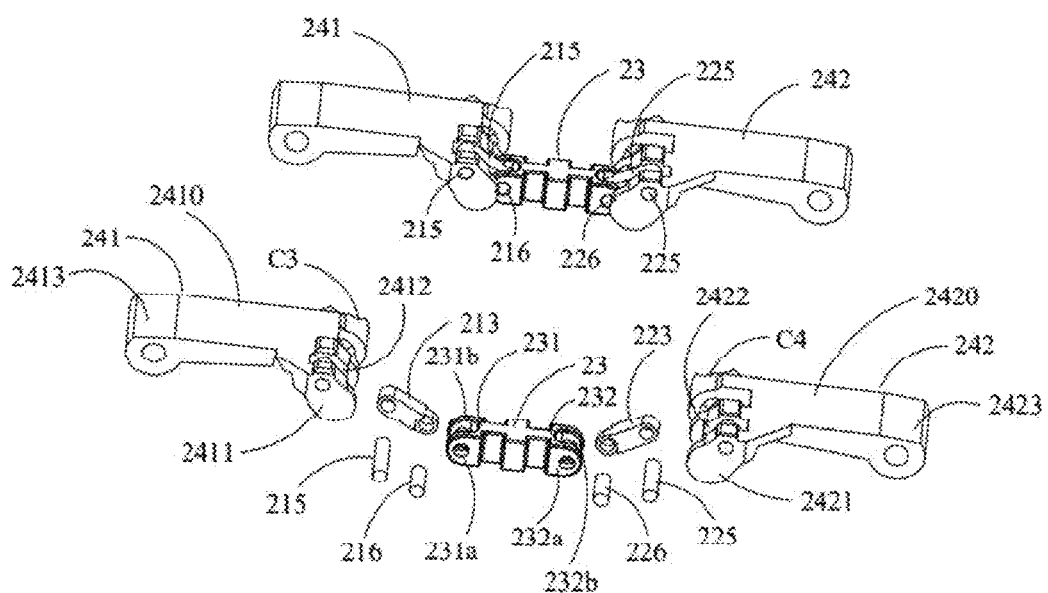
FIG. 7 is a schematic diagram of structure of a first holding arm, a second holding arm, and a moving block provided by an embodiment of the present disclosure.

Refer to FIGS. 4 to 7. FIG. 5 is a schematic exploded view of a hinge provided by an embodiment of the present disclosure, FIG. 6 is a structural schematic view of a moving block and a fixed support provided by an embodiment of the present disclosure, and FIG. 7 is a structural schematic view of a first holding arm, a second holding arm and a moving block provided by an embodiment of the present disclosure.

The fixed support 10 includes a first fixed support 11 which includes a main body portion 110 and a first connection portion 113, a second connection portion 114, a third connection portion 115, and a fourth connection portion 116, which protrude from the main body portion 110. Two through holes 123 are defined by the main body portion 110, and the through holes 123 are used to fix the first fixed support 11 to the third housing 600 by a screw connection.

The first connection portion 113 and the second connection portion 114 are respectively located on opposite sides of the main body portion 110, the first connection portion 113 and the third connection portion 115 are located on the same side of the main body portion 110, and the second connection portion 114 and the fourth connection portion 116 are located on the same side of the main body portion 110. A Shaft hole is individually defined by the first connection portion 113, the second connection portion 114, the third connection portion 115, and the fourth connection portion 116.

Both the first hinge 2a and the second hinge 2b include a holding mechanism 24 which includes a first holding arm 241 and a second holding arm 242 disposed opposite the first holding arm 241. The first holding arm 241 includes a first body portion 2410 and a fifth connection portion 2411 and a third cam C3, which protrude from the same side of the first body portion 2410. The third cam C3 is spaced from the fifth connection portion 2411. A shaft hole is defined by the third cam C3, and a first avoidance groove 2412 is defined by the fifth connection portion 2411. A shaft hole is individually defined by two side walls of the first avoidance groove 2412.

The second holding arm 242 includes a second body portion 2420 and a sixth connection portion 2421 and a fourth cam C4, which protrude from the same side of the second body portion 2420. The fourth cam C4 is spaced from the sixth connection portion 2421. A shaft hole is defined by the fourth cam C4, and a second avoidance groove 2422 is defined by the sixth connection portion 2421. A shaft hole is individually defined by two side walls of the second avoidance groove 2422.

The first transmission member 212 includes a first link 213, the second transmission member 222 includes a second link 223, and the moving block 23 includes a base portion 230 and a first extension portion 231 and a second extension portion 232, which are connected to opposite sides of the base portion 230. Both of the first extension portion 231 and the second extension portion 232 include two opposite extension plates extending from the base portion 230. One end of the first link 213 is fixedly connected to the first rotation member 211, and the other end of the first link 213 is rotatably connected between the two extension plates of the first extension portion 231 of the moving block 23. One end of the second link 223 is fixedly connected to the second rotation member 221, and the other end of the second link 223 is rotatably connected between the two extension plates of the second extension portion 232 of the moving block 23.

The first extension portion 231 includes a first extension plate 231a and second extension plate 231b opposite the first extension plate 231a, and the first extension plate 231a and the second extension plate 231b are spaced apart from each other. A coaxial shaft hole is individually defined by the first extension plate 231a and the second extension plate 231b. The second extension portion 232 includes a third extension plate 232a and a fourth extension plate 232b opposite the third extension plate 232a, and the third extension plate 232a and the fourth extension plate 232b are spaced apart from each other. A coaxial shaft hole is individually defined by the third extension plate 232a and the fourth extension plate 232b.

The first rotation member 211 includes a first rotation shaft 214, a third rotation shaft 215, and a fifth rotation shaft 216. An axis of the first rotation shaft 214 coincides with the first axis L1, and the first rotation shaft 214 passes through the first connection portion 113, the third connection portion 115, and the third cam C3. A shaft hole is individually defined by both ends of the first link 213, a first end of the first link 213 extends into the first avoidance groove 2412 of the fifth connection portion 2411 of the first holding arm 241, and the third rotation shaft 215 passes through the first end of the first link 213 and the fifth connection portion 2411 of the first holding arm 241. The first holding arm 241 can rotate relative to the third rotation shaft 215, and the first link 213 is fixedly connected to the third rotation shaft 215. A second end of the first link 213 extends between the first extension plate 231a and the second extension plate 231b of the first extension portion 231 of the moving block 23, and the fifth rotation shaft 216 passes through the second portion of the first link 213 and the first extension portion 231. The first link 213 can rotate relative to the fifth rotation shaft 216, and the moving block 23 is fixedly connected to the fifth rotation shaft 216.

The second rotation member 221 includes a second rotation shaft 224, a fourth rotation shaft 225, and a sixth rotation shaft 226. An axis of the second rotation shaft 224 coincides with the second axis L2. The second rotation shaft 224 passes through the second connection portion 114 and the fourth connection portion 116. A shaft hole is individually defined by both ends of the second link 223. A first end of the second link 223 extends into the second avoidance groove of the second holding arm 242, and the fourth rotation shaft 225 passes through the first end of the second link 223 and the sixth connection portion 2421 of the second holding arm 242. The sixth connection portion 2421 can rotate relative to the fourth rotation shaft 225, and the second link 223 is fixedly connected to the fourth rotation shaft 225. A second end of the second link 223 extends between the third extension plate 232a and the fourth extension plate 232b of the second extension portion 232 of the moving block 23. The sixth rotation shaft 226 passes through the second end of the second link 223 and the second extension portion 232. The second link 223 can rotate relative to the sixth rotation shaft 226, and the moving block 23 is fixedly connected to the sixth rotation shaft 226.

Figure 8:
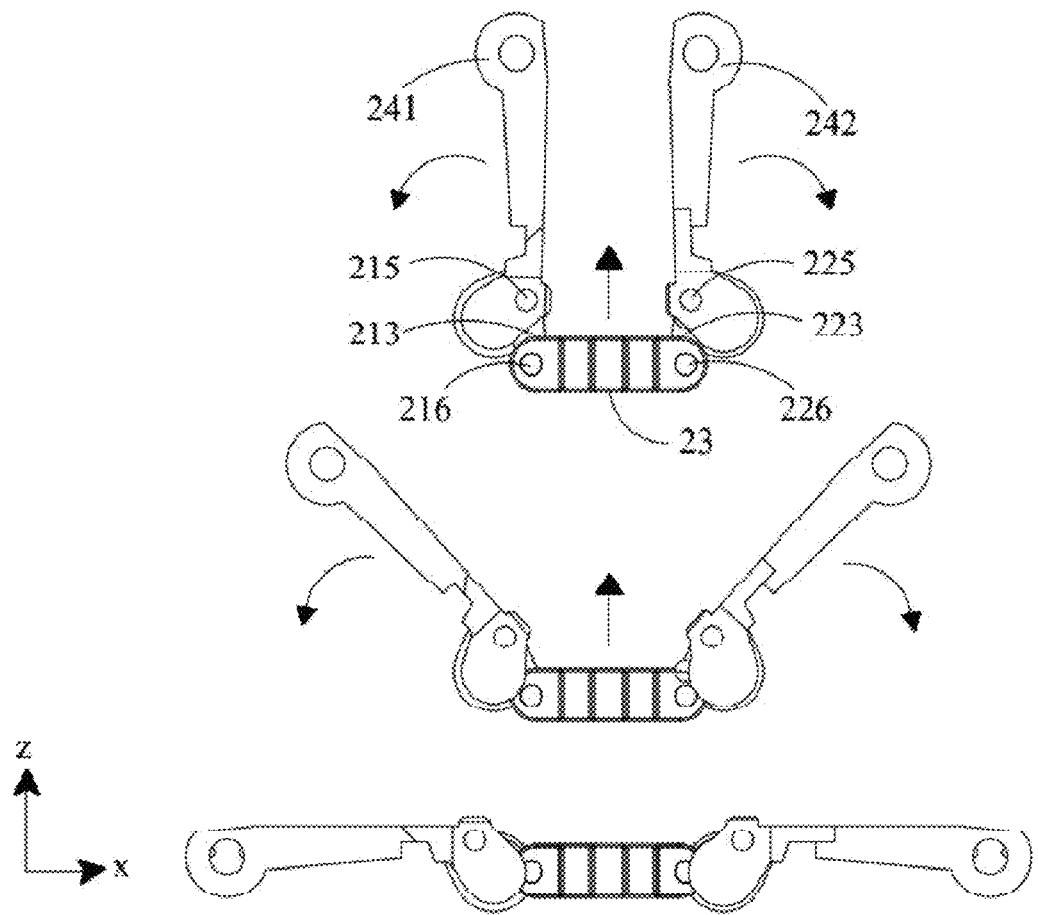
FIG. 8 is a schematic diagram of the unfolding process of the hinge provided by an embodiment of the present disclosure.

Refer to FIG. 4 and FIG. 8. FIG. 8 is a schematic diagram of an unfolding process of a hinge provided by an embodiment of the present disclosure. In the unfolding process of the hinge, the first holding arm 241 drives the third rotation shaft 215 to rotate around the first axis L1 in a direction of the arrow as shown in the figure, the third rotation shaft 215 drives the first link 213 to rotate around the fifth rotation shaft 216 in the direction of the arrow as shown in the figure, the second holding arm 242 drives the fourth rotation shaft 225 to rotate around the second axis L2 in the direction of the arrow as shown in the figure, and the fourth rotation shaft 225 drives the second link 223 to rotate around the sixth rotation shaft 226 in the direction of the arrow as shown in the figure. The moving block 23 is driven by the first link 213 and the second link 223 to move in the direction of the arrow shown in the figure (i.e., the third direction z).

It can be understood that the unfolding process of the hinge as shown in FIG. 8 is reversible. During the folding process of the hinge, the first holding arm 241 drives the third rotation shaft 215 to rotate around the first axis L1 in a direction opposite the direction of the arrow shown in the figure, the third rotation shaft 215 drives the first link 213 to rotate around the fifth rotation shaft 216 in the direction opposite the direction of the arrow shown in the figure, the second holding arm 242 drives the fourth rotation shaft 225 to rotate around the second axis L2 in the direction opposite the direction of the arrow shown in the figure, and the fourth rotation shaft 225 drives the second link 223 to rotate around the sixth rotation shaft 226 in the direction opposite the direction of the arrow shown in the figure. The moving block 23 is driven by the first link 213 and the second link 223 to move in the direction opposite the direction of the arrow as shown in the figure (i.e., a direction opposite the third direction z).

During the unfolding or folding process of the hinge, the moving block 23 always moves in the third direction z or the direction opposite the third direction z, and the first extension portion 231 and the second extension portion 232 of the moving block 23 always maintain in the same horizontal plane. In this way, the first link 213 and the second link 223 can respectively rotate around the fifth rotation shaft 216 and the sixth rotation shaft 226 at the same rotation speed, thereby achieving an effect of synchronous rotation of the first rotation mechanism 21 and the second rotation mechanism 22.

A first chute 14 is defined by the fixed support 10, and the moving block 23 is slidably disposed in the first chute 14.

As shown in FIG. 6, a first chute 14 is defined by the first fixed support 11, and the first chute 14 penetrates a main body portion 110 of the first fixed support 11 in the third direction z. The moving block 23 is slidably disposed in the first chute 14, and can only move in the first chute 14 in the third direction z or a direction opposite the third direction z, so as to ensure that the first rotation mechanism 21 and the second rotation mechanism 22 can rotate synchronously, and stuck of the moving block 23 during the sliding process can be prevented.

A protrusion 141 is provided on a wall surface of the first chute 14, a groove 233 is defined by the base portion 230 of the moving block 23, and the protrusion 141 is slidably received in the groove 233.

As shown in FIG. 6, two opposite side walls of the first chute 14 are individually provided with a protrusion 141, and a groove 233 is individually defined by portions of opposite sides of the base portion 230 of the moving block 23 corresponding to the protrusions 141. The protrusion 141 is slidably received in the groove 233. In this way, a movement direction of the moving block 23 is further limited by the protrusion 141, so as to prevent the moving block 23 from being deflected left and right, thereby reducing a virtual position of the moving block 23 matched with the first chute 14, and increasing stability of the moving block 23 during moving process.

In practical applications, a number of the grooves 233 defined by the moving block 23 and a number of the protrusions 141 on the wall surface of the first chute 14 can be determined according to a size of the moving block 23 and a size of the first chute 14. The larger the sizes of the moving block 23 and the first chute 14 are, the more the numbers of the required grooves 233 and the protrusions 141 are. The number of the grooves 233 defined by the moving block 23 and the number of the protrusions 141 on the wall surface of the first chute 14 can be determined according to actual situations, and may be 1, 2, 3, or more, etc., and is not limited here.

The holding mechanism 24 further includes a first holding member 243 which is provided with a first protrusion C11 and a second protrusion C21. A first groove C32 is defined by the first holding arm 241, and a second groove C42 is defined by the second holding arm 242. The first holding arm 241 is connected to the first rotation member 211, the second holding arm 242 is connected to the second rotation member 221, and the first rotation member 211 and the second rotation member 221 are rotatably connected to the first holding member 243. In response to the hinge being in one of the folded state or the unfolded state, the first protrusion C11 is received in the first groove C32, and the second protrusion C21 is received in the second groove C42. In response to the flexible portion 101 being in the other state of the folded state or the unfolded state, the first protrusion C11 is separated from the first groove C32, and the second protrusion C21 is separated from the second groove C42.

Figure 9:
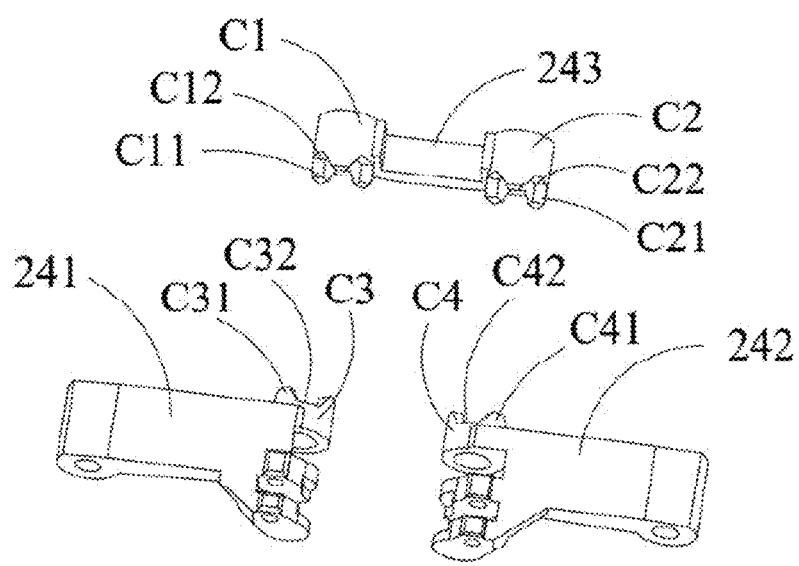
FIG. 9 is a schematic exploded diagram of a holding mechanism provided by an embodiment of the present disclosure.

Refer to FIG. 4, FIG. 5, and FIG. 9. FIG. 9 is a schematic exploded view of a holding mechanism provided by the embodiment of the present disclosure. In an embodiment, a snap-fit slot is defined by a bottom surface of the main body portion 110 of the first fixed support 11, and a main body portion of the first holding member 243 is snapped into the snap-fit slot. The first holding member 243 includes a first cam C1 and a second cam C2, which protrude from the main body portion. The first cam C1 may include a plurality of first protrusions C11 which protrude from an edge of the first cam C1 in the second direction y. A third groove C12 is defined between the first protrusions C11 adjacent to each other. The first rotation shaft 214 passes through the first cam C1, and can rotate relative to the first cam C1. The second cam C2 may include a plurality of second protrusions C21 which protrude from an edge of the second cam C2 in the second direction y. A fourth groove C21 is defined between the second protrusions C21 adjacent to each other. The first rotation shaft 214 passes through the second cam C2, and can rotate relative to the second cam C2.

The third cam C3 of the first holding arm 241 may include a plurality of third protrusions C31 protruding from an edge of the third cam C3 in the second direction y, and a first groove C32 is defined between the third protrusions C31 adjacent to each other. The first rotation shaft 214 passes through the third cam C3. The second holding arm 242 includes a fourth cam C4 protruding from a body of the second holding arm 242 in the first direction x. The fourth cam C4 may include a plurality of fourth protrusions C41 protruding from an edge of the fourth cam C4 in the second direction y. A second groove C42 is defined by the fourth protrusions C41 adjacent to each other, and the second rotation shaft 224 passes through the fourth cam C4.

Each of the first protrusion C11 to the fourth protrusion C41 has a flat end which has a sliding surface. The sliding surface is an abutment surface of two inclined side surfaces of each protrusion.

The holding mechanism 24 further includes a first elastic member 244 and a second elastic member 245, and both the first elastic member 244 and the second elastic member 245 are springs. The first elastic member 244 surrounds the first rotation shaft 214, and is clamped between the first holding member 243 and the first connection portion 113. The second elastic member 245 surrounds the second rotation shaft 224, and is clamped between the first holding member 243 and the second connection portion 114.

In response to the electronic device 1000 being in an unfolded state or a completely folded state, the hinge is in an unfolded state or a completely folded state, the flexible portion 101 is in an unfolded state or a completely folded state, the first cam C1 of the first holding member 243 is ordinarily engaged with the third cam C3 of the first holding arm 241, and the second cam C2 of the first holding member 243 is ordinarily engaged with the fourth cam C4 of the second holding arm 242.

The ordinary engagement means that, for example, the first protrusion C11 of the first cam C1 is received in the first groove C32 of the third cam C3; the third protrusion C31 is received in the third groove C12; the second protrusion C21 of the second cam C2 is received in the second groove C42 of the fourth cam C4; and the fourth protrusion C41 is received in the fourth groove C22.

In response to the electronic device 1000 being in the transitional folded state, the hinge is in the transitional folded state, the flexible portion 101 is in the folded state, the first cam C1 of the first holding member 243 is in open engagement with the third cam C3 of the first holding arm 241, and the second cam C2 of the first holding member 243 is in open engagement with the fourth cam C4 of the second holding arm 242.

The open engagement means that, for example, the first protrusion C11 of the first cam C1 is disengaged from the first groove C32 of the third cam C3, and a sliding surface of the first protrusion C11 is in contact with a sliding surface of the third protrusion C31, and the second protrusion C21 of the second cam C2 is disengaged from the second groove C42 of the fourth cam C4, and a sliding surface of the second protrusion C21 is in contact with a sliding surface of the fourth protrusion C41.

During the process of the electronic device 1000 being folded from the unfolded state to the transitional folded state, the first holding arm 241 rotates about the first axis L1, the second holding arm 242 rotates about the second axis L2, and the cams engaged with each other gradually changes from the ordinary engagement to the open engagement, where the first protrusion C11 is gradually disengaged from the first groove C32, the second protrusion C21 is gradually disengaged from the second groove C42, and the first elastic member 244 and the second elastic member 245 are compressed by the first holding member 243, resulting in a gradual increase in an amount of elastic deformation. In response to an angle between the first portion 102 and the second portion 103 ranging from 0° to 30°, under an action of the compressing force of each of the elastic members and a pressure angle of each of the cams, the electronic device 1000 can be restored to an unfolded state without external force.

In response to the electronic device 1000 being in a transitional folded state, the plurality of cams engaged with each other are in the open engagement, and the pressure angle of each of the cams is 0°, the angle between the first portion 102 and the second portion 103 may be maintained at to 150°, and the elastic deformation amount of each of the elastic member remains unchanged, so that the electronic device 1000 can be maintained in a transitional folded state without external force.

During the electronic device 1000 being folded from the transitional folded state to the completely folded state, the first protrusion C11 is gradually received in the first groove C32, the second protrusion C21 is gradually received in the second groove C42, the elastic deformation of the first elastic member 244 and the second elastic member 245 gradually decreases. In response to the angle between the first portion 102 and the second portion 103 of the flexible display panel body ranging from 150° to 180°, under the action of the compressing force of each of the elastic members and the pressure angle of the cams, the electronic device 1000 can automatically be folded from the transitional folded state to the completely folded state without external force.

In practical applications, a number of the holding members in the holding mechanism 24 is not limited to 1 or 2 mentioned in the above embodiments, but may also be 3, 4, or more. A number of the elastic members needs to meet the number of the holding members. The larger the size of the electronic device is, the greater the number of the required holding members is.

Figure 10:
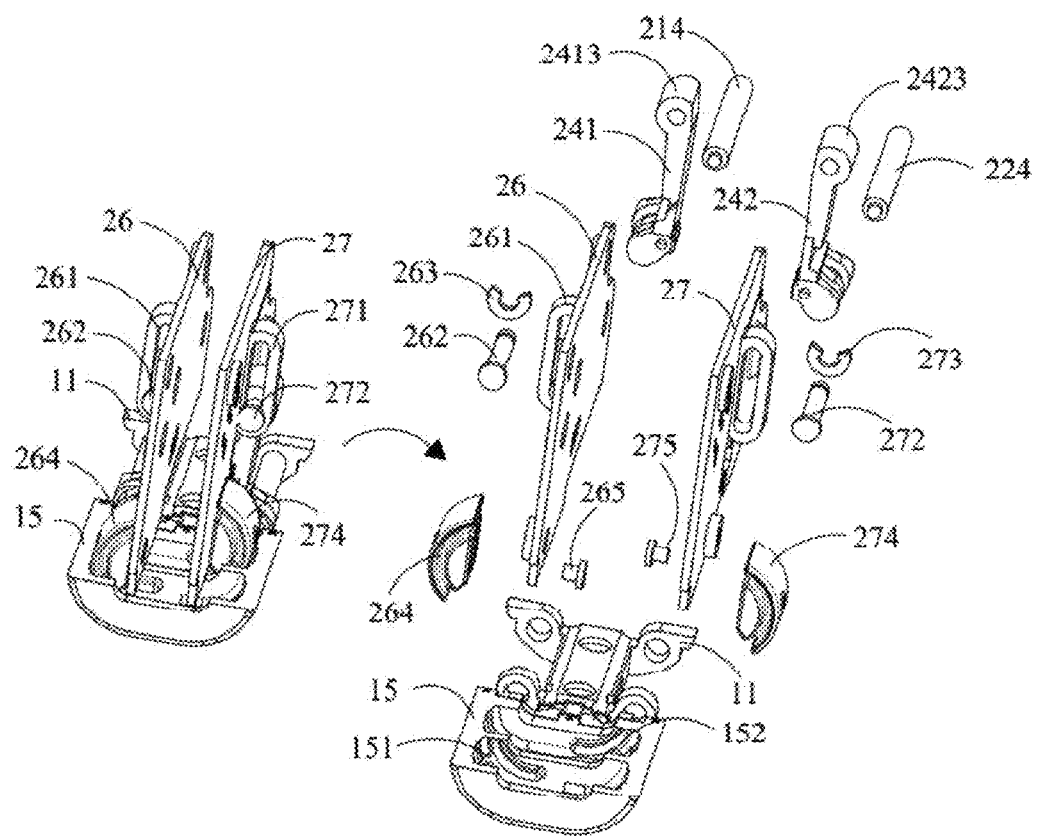
FIG. 10 is a schematic diagram of structures of the first support plate and the second support plate provided by an embodiment of the present disclosure.

Refer to FIG. 10. FIG. 10 is a schematic diagram of structures of a first support plate and a second support plate provided by an embodiment of the present disclosure. Each of the first hinge 2a and the second hinge 2b includes a first support plate 26 and a second support plate 27. The first support plate 26 is connected to the first holding arm 241, so as to move under driving of the first holding arm 241, and the second support plate 27 is connected to the second holding arm 242, so as to move under driving of the second holding arm 242. The first support plate 26 is fixedly connected to a front side of the first housing 200 by screws. The first support plate 26 can be used to support the first portion 102. The second support plate 27 is fixedly connected to a front side of the second housing 300 by screws. The second support plate 27 can be used to support the second portion 103.

A second chute 261 is defined by the first support plate 26, and a third chute 271 is defined by the second support plate 27. Both the second chute 261 and the third chute 271 are linear chutes. The first holding arm 241 includes a seventh connect portion 2413 protruding from one end of the first body portion 2410 opposite the fifth connection portion 2411. A shaft hole is defined by the seventh connection portion 2413. The second holding arm 242 includes an eighth connection portion 2423 protruding from one end of the second body portion 2420 opposite the sixth connection portion 2421. A shaft hole is defined by the eighth connection portion 2423.

The hinge further includes a first fixing member 262, a second fixing member 272, a third fixing clip 263, and a fourth fixing clip 273. The first fixing member 262 and the second fixing member 272 are both pin shafts. The first fixing member 262 passes through the second chute 261 and the shaft hole of the seventh connection portion 2413, and is fixedly connected to the seventh connection portion 2413. A third fixing clip 263 surrounds one end of the first fixing member 262 passing through seventh connect portion 2413, and the first fixing member 262 can slide and rotate relative to the second chute 261. The second fixing member 272 passes through the third chute 271 and the shaft hole of the eighth connection portion 2423, and is fixedly connected to the eighth connection portion 2423. A fourth fixing clip 273 surrounds one end of the second fixing member 272 passing through the eighth connection portion 2423, and the second fixing member 272 can slide and rotate relative to the third chute 271.

Both the first hinge 2a and the second hinge 2b include a first sliding block 264 and a second sliding block 274. The first sliding block 264 is fixedly connected to the first support plate 26 by a first screw 265, and the second sliding block 274 is fixedly connected to the second support plate 27 by a second screw 275.

The fixed support 10 includes a second fixed support 15 which is fixedly connected to the first fixed support 11 by a screw connection or a snap-fit manner. A fourth chute 151 and a fifth chute 152 are defined by the second fixed support 15, and the first sliding block 264 is slidably disposed in the fourth chute 151, and the second sliding block 274 is slidably disposed in the fifth chute 152.

A position of the first fixing member 262 in the second chute 261 where the hinge is in the unfolded state is different from a position of the first fixing member 262 in the second chute 261 where the hinge is in the folded state. A position of the second fixing member 272 in the third chute 271 where the hinge is in the unfolded state is different from a position of the second fixing member 272 in the third chute 271 where the hinge is in the folded state.

Figure 11:
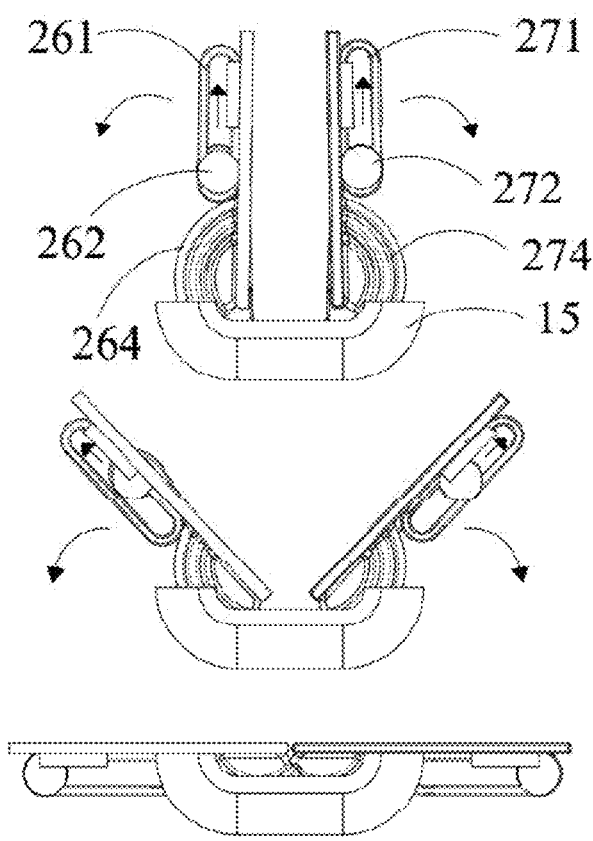
FIG. 11 is a schematic diagram of movements of the first support plate and the second support plate provided by an embodiment of the present disclosure.

Refer to FIG. 11. FIG. 11 is a schematic diagram of movements of the first support plate and the second support plate provided by an embodiment of the present disclosure. In response to the electronic device 1000 being in a completely folded state, the hinge is in the folded state, the flexible portion 101 is in the folded state, the first fixing member 262 is located on one end of the second chute 261 close to the second fixed support 15, and the second fixing member 272 is located on one end of the third chute 271 close to the second fixed support 15.

During a process of the electronic device 1000 being unfolded from the completely folded state to the unfolded state, the first support plate 26 and the second support plate 27 rotate opposite to each other in a direction of an arrow as shown in the figure. During the process of the first support plate 26 rotating in the direction of the arrow as shown in the figure, the first fixing member 262 drives the first holding arm 241 to rotate in the same direction, slides in the second chute 261 in the direction of the arrow as shown in the figure, and gradually moves away from the second fixed support 15. During the process of the support plate 27 rotating in the direction of the arrow as shown in the figure, the second fixing member 272 drives the second holding arm 242 to rotate in the same direction, slides in the third chute 271 in the direction of the arrow as shown in the figure, and gradually moves away from the second fixed support 15.

In response to the electronic device 1000 being in the unfolded state, the hinge is in the unfolded state, the flexible portion 101 is in the unfolded state, the first fixing member 262 is located on one end of the second chute 261 away from the second fixed support 15, and the second fixing member 272 is located on one end of the third chute 271 away from the second fixed support 15.

In an embodiment, as shown in FIG. 3, the hinge further includes a third support plate 28 and a fourth support plate 29. The third support plate 28 is fixedly connected to the front side of the first housing 200 by screws, the third support plate 28 and the first support plate 26 are on the same plane, and are used to support the first portion 102. The fourth support plate 29 and the second housing 300 are fixedly connected by screws, the fourth support plate 29 and the second support plate 27 are on the same plane, and are used to support the second portion 103.

Beneficial effect of the embodiments of the present disclosure:

The embodiments of the present disclosure provide a hinge, a flexible display panel, and an electronic device. The electronic device includes a flexible display panel which includes a flexible display panel body and a hinge. The flexible display panel body includes a flexible portion and a first portion and a second portion, which are connected to opposite ends of the flexible portion. The hinge includes a first rotation mechanism, a second rotation mechanism, and a moving block. The first rotation mechanism includes a first rotation member and a first transmission member. The first rotation member is rotatably connected to the fixed support, and the first transmission member is fixedly connected to the first rotation member. The second rotation mechanism is disposed opposite the first rotation mechanism, and includes a second rotation member and a second transmission member. The second rotation member is rotatably connected to the fixed support, and the second transmission member is fixedly connected to the second rotation member. The first portion is fixedly connected to the first rotation member, the second portion is fixedly connected to the second rotation member, the moving block is located under the flexible portion, and the first transmission member and the second transmission member are rotatably connected to the moving block, so as to drive the moving block away from or close to the fixed support. The first rotation mechanism and the second rotation mechanism are interlinked by the moving block, so that the first rotation mechanism and the second rotation mechanism rotate at the same speed, thereby achieving an effect of bilateral synchronous movement in the electronic device, and preventing the flexible display panel main body from being pressed or pulled during folding or unfolding processes of the electronic device.

In summary, although the preferred embodiments of the present disclosure are disclosed as above, the above preferred embodiments are not intended to limit the present disclosure. Those skilled in the art can make various changes and modifications without departing from the spirit and scope of the present disclosure. Therefore, the protection scope of the present disclosure is subject to the appended claims.

What is claimed is:

1. A hinge, comprising:
   a fixed support;
   a first rotation mechanism including a first rotation member and a first transmission member, wherein the first rotation member is rotatably connected to the fixed support, and the first transmission member is fixedly connected to the first rotation member;
   a second rotation mechanism disposed opposite the first rotation mechanism and including a second rotation member and a second transmission member, wherein the second rotation member is rotatably connected to the fixed support, and the second transmission member is fixedly connected to the second rotation member; and
   a moving block, wherein the first transmission member and the second transmission member are rotatably connected to the moving block, so as to drive the moving block away from or close to the fixed support;
   wherein the first transmission member includes a first link, the second transmission member includes a second link, and the moving block includes a base portion and a first extension portion and a second extension portion, which are connected to opposite sides of the base portion, wherein each of the first extension portion and the second extension portion includes two opposite extension plates extending from the base portion;
   wherein one end of the first link is fixedly connected to the first rotation member, the other end of the first link is rotatably connected between the two extension plates of the first extension portion of the moving block, one end of the second link is fixedly connected to the second rotation member, and the other end of the second link is rotatably connected between the two extension plates of the second extension portion of the moving block.

2. The hinge of claim 1, wherein a first chute is defined by the fixed support, and the moving block is slidably disposed in the first chute.

3. The hinge of claim 2, wherein a wall surface of the first chute is provided with a protrusion, a groove is defined by the base portion of the moving block, and the protrusion is slidably received in the groove.

4. The hinge of claim 1, wherein the hinge further comprises a holding mechanism, and the holding mechanism includes a first holding arm, a second holding arm, and a first holding member, wherein the first holding member is provided with a first protrusion and a second protrusion, a first groove is defined by the first holding arm, and a second groove is defined by the second holding arm;
   wherein the first holding arm is connected to the first rotation member, the second holding arm is connected to the second rotation member, and the first rotation member and the second rotation member are rotatably connected to the first holding member;
   in response to the hinge being in one of a folded state or an unfolded state, the first protrusion is received in the first groove, and the second protrusion is received in the second groove; in response to the hinge being in the other state of the folded state or the unfolded state, the first protrusion is separated from the first groove, and the second protrusion is separated from the second groove.

5. The hinge of claim 4, wherein the holding mechanism includes a first elastic member and a second elastic member, and the fixed support includes a main body portion and a first connection portion and a second connection portion, which extend from opposite sides of the main body portion,
   wherein the first rotation member passes through the first connection portion, and the second rotation member passes through the second connection portion;
   wherein the first elastic member surrounds the first rotation member and is clamped between the first holding member and the first connection portion, and the second elastic member surrounds the second rotation member and is clamped between the first holding portion and the first connection portion.

6. The hinge of claim 4, wherein the hinge further comprises a first support plate and a second support plate;
   wherein the first support plate is connected to the first holding arm, so as to move under driving of the first holding arm, and the second support plate is connected to the second holding arm, so as to move under driving of the second holding arm.

7. The hinge of claim 6, wherein the hinge further comprises a first fixing member and a second fixing member, wherein a second chute is defined by the first support plate, a third chute is defined by the second support plate, the first fixing member passes through the second chute and is fixedly connected to the first holding arm, and the second fixing member passes through the third chute and is fixedly connected to the second holding arm;
   wherein a position of the first fixing member in the second chute where the hinge is in the unfolded state is different from a position of the first fixing member in the second chute where the hinge being in the folded state; and a position of the second fixing member in the third chute where the hinge is in the unfolded state is different from a position of the second fixing member in the third chute where the hinge being in the folded state.

8. A flexible display panel, comprising:
   a flexible display panel main body including a flexible portion and a first portion and a second portion, which are connected to opposite ends of the flexible portion; and
   a hinge, including:
      a fixed support;
      a first rotation mechanism including a first rotation member and a first transmission member, wherein the first rotation member is rotatably connected to the fixed support, and the first transmission member is fixedly connected to the first rotation member;
      a second rotation mechanism disposed opposite the first rotation mechanism and including a second rotation member and a second transmission member, wherein the second rotation member is rotatably connected to the fixed support, and the second transmission member is fixedly connected to the second rotation member; and
      a moving block, wherein the first transmission member and the second transmission member are rotatably connected to the moving block, so as to drive the moving block away from or close to the fixed support; wherein the first portion is fixedly connected to the first rotation member, the second portion is fixedly connected to the second rotation member, and the moving block is located under the flexible portion;

wherein the first transmission member includes a first link, the second transmission member includes a second link, and the moving block includes a base portion and a first extension portion and a second extension portion, which are connected to opposite sides of the base portion, wherein each of the first extension portion and the second extension portion includes two opposite extension plates extending from the base portion;

wherein one end of the first link is fixedly connected to the first rotation member, the other end of the first link is rotatably connected between the two extension plates of the first extension portion of the moving block, one end of the second link is fixedly connected to the second rotation member, and the other end of the second link is rotatably connected between the two extension plates of the second extension portion of the moving block.

9. The flexible display panel of claim 8, wherein a first chute is defined by the fixed support, and the moving block is slidably disposed in the first chute.

10. The flexible display panel of claim 9, wherein a wall surface of the first chute is provided with a protrusion, a groove is defined by the base portion of the moving block, and the protrusion is slidably received in the groove.

11. The flexible display panel of claim 8, wherein the hinge further comprises a holding mechanism, and the holding mechanism includes a first holding arm, a second holding arm, and a first holding member, wherein the first holding member is provided with a first protrusion and a second protrusion, a first groove is defined by the first holding arm, and a second groove is defined by the second holding arm;

wherein the first holding arm is connected to the first rotation member, the second holding arm is connected to the second rotation member, and the first rotation member and the second rotation member are rotatably connected to the first holding member;

in response to the hinge being in one of a folded state or an unfolded state, the first protrusion is received in the first groove, and the second protrusion is received in the second groove; in response to the hinge being in the other state of the folded state or the unfolded state, the first protrusion is separated from the first groove, and the second protrusion is separated from the second groove.

12. The flexible display panel of claim 11, wherein the holding mechanism includes a first elastic member and a second elastic member, and the fixed support includes a main body portion and a first connection portion and a second connection portion, which extend from opposite sides of the main body portion, wherein the first rotation member passes through the first connection portion, and the second rotation member passes through the second connection portion;

wherein the first elastic member surrounds the first rotation member and is clamped between the first holding member and the first connection portion, and the second elastic member surrounds the second rotation member and is clamped between the first holding portion and the first connection portion.

13. The flexible display panel of claim 11, wherein the hinge further comprises a first support plate and a second support plate;

wherein the first support plate is connected to the first holding arm, so as to move under driving of the first holding arm, and the second support plate is connected to the second holding arm, so as to move under driving of the second holding arm.

14. The flexible display panel of claim 13, wherein the hinge further comprises a first fixing member and a second fixing member, wherein a second chute is defined by the first support plate, a third chute is defined by the second support plate, the first fixing member passes through the second chute and is fixedly connected to the first holding arm, and the second fixing member passes through the third chute and is fixedly connected to the second holding arm;

wherein a position of the first fixing member in the second chute where the hinge is in the unfolded state, is different from a position of the first fixing member in the second chute where the hinge is in the folded state; and a position of the second fixing member in the third chute where the hinge is in the unfolded state, is different from a position of the second fixing member in the third chute where the hinge is in the folded state.

15. An electronic device, comprising: a flexible display panel, and the flexible display panel includes:

a flexible display panel main body including a flexible portion and a first portion and a second portion, which are connected to opposite ends of the flexible portion; and a hinge, including:

a fixed support;

a first rotation mechanism including a first rotation member and a first transmission member, wherein the first rotation member is rotatably connected to the fixed support, and the first transmission member is fixedly connected to the first rotation member;

a second rotation mechanism disposed opposite the first rotation mechanism and including a second rotation member and a second transmission member, wherein the second rotation member is rotatably connected to the fixed support, and the second transmission member is fixedly connected to the second rotation member; and a moving block, wherein the first transmission member and the second transmission member are rotatably connected to the moving block, so as to drive the moving block away from or close to the fixed support;

wherein the first portion is fixedly connected to the first rotation member, the second portion is fixedly connected to the second rotation member, and the moving block is located under the flexible portion;

wherein the first transmission member includes a first link, the second transmission member includes a second link, and the moving block includes a base portion and a first extension portion and a second extension portion, which are connected to opposite sides of the base portion, wherein each of the first extension portion and the second extension portion includes two opposite extension plates extending from the base portion;

wherein one end of the first link is fixedly connected to the first rotation member, the other end of the first link is rotatably connected to between the two extension plates of the first extension portion of the moving block, one end of the second link is fixedly connected to the second rotation member, and the other end of the second link is rotatably connected between the two extension plates of the second extension portion of the moving block.

16. The electronic device of claim 15, wherein a first chute is defined by the fixed support, and the moving block is slidably disposed in the first chute.

17. The electronic device of claim 16, wherein a wall surface of the first chute is provided with a protrusion, a groove is defined by the base portion of the moving block, and the protrusion is slidably received in the groove.

* * * * *